United States Patent [19]

Ishige et al.

[11] Patent Number: 4,661,842
[45] Date of Patent: Apr. 28, 1987

[54] LUMINANCE/CHROMINANCE SEPARATOR

[75] Inventors: Masafumi Ishige; Yoshitaka Kanemoto; Tamio Yokoyama; Ichitaro Sato, all of Kanagawa, Japan

[73] Assignee: Sony Corporation, Tokyo, Japan

[21] Appl. No.: 753,573

[22] Filed: Jul. 10, 1985

[30] Foreign Application Priority Data

Jul. 11, 1984 [JP] Japan .................................. 59-144071

[51] Int. Cl.⁴ ............................................. H04N 5/21
[52] U.S. Cl. ...................................... 358/36; 358/31; 358/37
[58] Field of Search .............................. 358/31, 36, 37

[56] References Cited

U.S. PATENT DOCUMENTS

4,489,346 12/1984 Tanaka et al. ......................... 358/31
4,558,353 12/1985 Hirota ................................... 358/36

Primary Examiner—Howard W. Britton
Assistant Examiner—Victor R. Kostak
Attorney, Agent, or Firm—Lewis H. Eslinger; Alvin Sinderbrand

[57] ABSTRACT

When separating a composite video signal into a luminance signal component and the chrominance signal component by the use of filtering, a high frequency cross-talk component of the luminance signal is present in the chrominance signal and this may be cancelled using a horizontal correlator that imparts time delays and detects maximum and minimum levels relative to a reference level. In such luminance cross-talk cancellation by means of the horizontal correlator the usable chrominance signal length is shortened by almost one wave length out of four, thereby reducing the usable chrominance signal each time such luminance/chrominance signal separation occurs in a dubbing operation, for example. By utilizing two chroma separators in series each including a nonadditive mixer circuit, the resultant output from the second chroma separator circuit has substantially the same length as the portion of the composite video signal fed as the input. As a further safety factor in preventing the chrominance signal from being produced with excessive noise, a time delayed version of the composite video signal is level checked with the output of the second chroma separator unit and the signal having the lesser level is produced as the output.

24 Claims, 19 Drawing Figures

FIG. 3D  $S_4$ $(=S_C+\Delta Y_H)$

LOST CHROMINANCE SIGNAL

LUMINANCE/CHROMINANCE SEPARATOR

BACKGROUND OF THE INVENTION

1. Field of the Invention

This invention relates generally to an apparatus for separating a signal from a composite signal formed of two signals and, more particularly, to an apparatus for separating a chrominance signal from a composite video signal made up of a luminance signal and the chrominance signal, for use in a color television receiver or a video tape recorder.

2. Description of the Background

The provision of a composite color video signal ultimately requires the separation of its component signals at the time of display, or at the time of recording if they are to be recorded separately, and the systems to accomplish such separation known heretofore typically employ various kinds of filters to separate the luminance signal and the chrominance signal from the composite video. An example of such kinds of filtering is the so-called comb filter used in conjunction with a bandpass filter. It has also been proposed to use horizontal correlators in conjunction with these signal separating filters. These horizontal correlators involve the delaying of the composite signal to derive a number of signals and then comparing the relative amplitudes of various signals to a reference level signal to produce a correlated output.

A principal problem to date with the use of a bandpass filter as the luminance/chrominance separator is that a high-frequency cross-talk component of the luminance signal cannot be removed by such bandpass filter because it is of so high a frequency that it is in the filter passband required by the chrominance signal. This high-frequency luminance cross-talk is the so-called cross-color component. Thus, the use of the horizontal correlator has been required in order to provide optimum signal separation in addition to using conventional filtering.

Although the horizontal correlator approach does overcome some of the problems presented by using only filtering for signal separation, the delay lines employed in the horizontal correlator necessitate the loss of a portion of the chrominance signal at the time of separation. This signal loss occurs each time the chrominance signal is separated from the composite and if this horizontal correlator is used with video tape recorder equipment, in which the chrominance signal can be separated from the composite video a number of times in performance of a typical editing operation, the usable chrominance signal is reduced at each separation. Thus, the color information that is available is correspondingly diminished to an unacceptable level.

OBJECTS AND SUMMARY OF THE INVENTION

Accordingly, it is an object of the present invention to provide a luminance/chrominance separator that can eliminate the above-noted defects inherent in the prior art.

Another object of this invention is to provide a luminance/chrominance separator in which the signals are separated from the composite video signal such that no component of the luminance signal appears in the chrominance signal.

A further object of this invention is to provide a luminance/chrominance separator in which the usable extent of the chrominance signal is not diminished following the separation operation.

In accordance with an aspect of the present invention, two chroma separator units are employed in succession to eliminate the high-frequency luminance cross-talk component from the chrominance. In the two successive chroma separator units, the respective input signal is time delayed and then synthesized using level detecting processing before being combined by using nonadding mixers, an output chrominance signal having a length as long as the corresponding portion of the original chrominance signal is produced.

The above and other objects, features, and advantages of the present invention will become apparent from the following detailed description of illustrated embodiments thereof to be read in conjunction with the accompanying drawings, in which like reference numerals represent like elements.

DETAILED DESCRIPTION OF THE PREFERRED EMBODIMENTS

Figure 1:
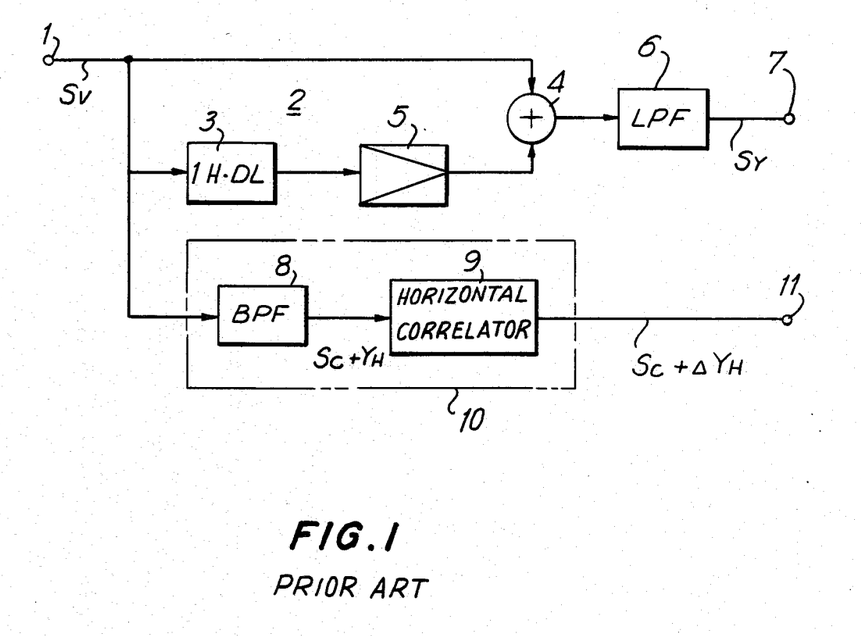
FIG. 1 is a schematic diagram of a luminance/chrominance separator known in the prior art.

In a known luminance/chrominance separator circuit such as shown in FIG. 1, the composite video signal $S_v$ is applied through an input terminal 1 to a luminance separator circuit 2. In this luminance separator circuit 2, the composite video signal is fed both to a time delay unit 3, which imparts a time delay equal to one horizontal scan period, and also to one input of a signal adder 4. The delayed composite signal is then fed through an amplifier 5 to another input of the signal adder 4 and the summed output signal is then passed through a low pass filter 6 to eliminate all but the luminance signal components. Thus, the separated luminance signal $S_Y$ is available at output terminal 7.

As indicated above, the use of only a bandpass filter to separate luminance and chrominance components of the composite video signal is ineffective to remove a high-frequency cross-talk component of the luminance signal, typically referred to as cross-color, from the chrominance signal, and that component is designated herein as $Y_H$. Thus, the output of a bandpass filter 8 to which the composite video signal $S_v$ is applied will be the chrominance component plus this high-frequency cross-color component $(S_v + Y_H)$. The resultant signal from bandpass filter 8 is fed to a horizontal correlator 9, which is intended to eliminate the cross-color component. Bandpass filter 8 and horizontal correlator 9 make up a chrominance separator unit 10 that has been previously proposed that produces the chrominance signal at output terminal 11. Horizontal correlator 9 is not perfect and some noise and a portion of the cross-color typically still remains, but most importantly the above-mentioned problem of losing a portion of the chrominance signal each time the composite video signal is passed through this horizontal correlator is present, thereby leading to a diminution of the usable chrominance signal each time the composite video signal is passed through the horizontal correlator.

Figure 2:
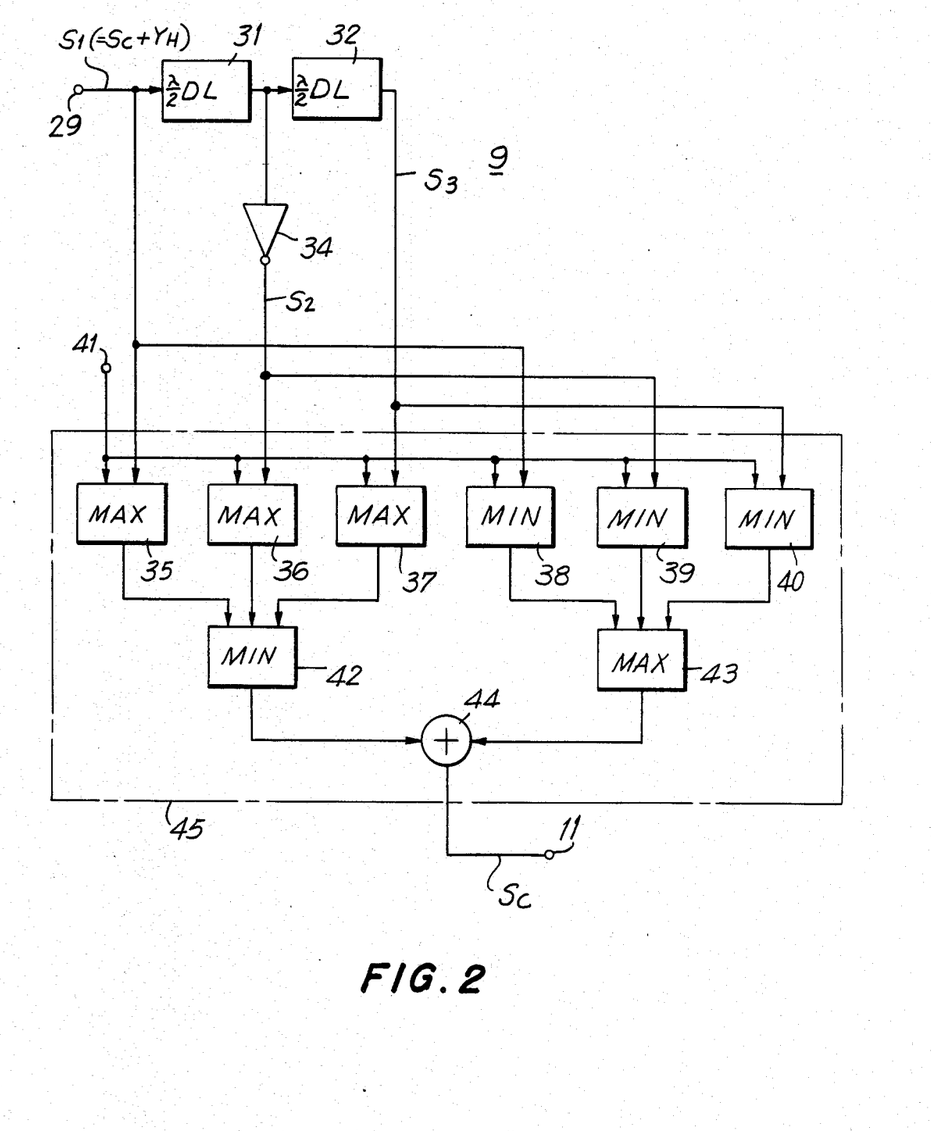
FIG. 2 is an embodiment of a horizontal correlator utilized in the separator of FIG. 1.

Horizontal correlator 9 of FIG. 1 is shown in more detail in FIG. 2, in which it is seen that the input signal $S_1$ is applied at input terminal 29, and this signal represents the chrominance component $S_c$ plus the high-frequency cross-color component $Y_H$. Signal $S_1$ is fed to a delay line 31 that has a time delay corresponding to the period of ½ of the wavelength of the subcarrier signal that is modulated by the actual baseband chrominance information when forming the composite video signal, and the output of delay line 31 is fed to a second delay line 32 that provides the same time delay as time delay unit 31. The output of first time delay unit 31 is also fed to a signal inverter 34, which inverts the sense or polarity of signals applied thereto. The output of inverter 34 is denoted as signal $S_2$, the output of second delay line 32 is denoted as signal $S_3$, and the waveforms of both of these signals are shown in FIGS. 3B and 3C, respectively.

The three signals having relative mutual time delays therebetween, $S_1$, $S_2$, and $S_3$, are fed to three maximum detecting circuits 35, 36, and 37, respectively. Additionally, signals $S_1$, $S_2$, and $S_3$ are also fed to three minimum detecting circuits 38, 39, and 40, respectively. The maximum and minimum detections take place in relation to a reference signal, and in the horizontal correlator of Fig. 2 a reference signal having a zero voltage level is applied at terminal 41 and is fed to maximum detecting circuits 35, 36, and 37 and also to minimum detecting circuits 38, 39, and 40. The reference level input terminal 41 is not shown in separator 10 of FIG. 1 in the interest of clarity. The outputs of maximum detection circuits 35, 36, and 37 are fed to respective inputs of a fourth minimum detection circuit 42, which operates to detect the one input signal having the lowest level among the positive signals detected by maximum detection circuits 35, 36, and 37 and to produce an output signal corresponding to such detection. Conversely, minimum detection circuits 38, 39, and 40 produce outputs fed to respective inputs of a fourth maximum detection circuit 43, which operates to detect the one having the highest level of the negative going signals as detected by minimum detectors 38, 39, and 40 and to produce an output signal corresponding to such detection. The output signal of minimum detection circuit 42 and the output signal of maximum detection circuit 43 are fed to adder 44 to produce an output signal that is intended to be void of the so-called cross-color luminance component and such output signal is then provided at output terminal 11. The minimum and maximum detecting circuits and the mixer can be referred to as a synthesizer or nonadditive mixer 45.

Figure 3A:
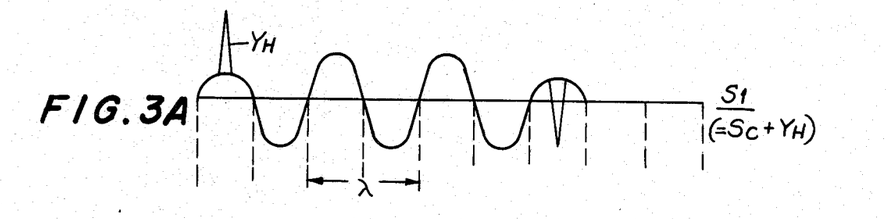
FIGS. 3A-3D are signal waveforms present during the operation of the circuit of FIG. 2.
Figure 3B:
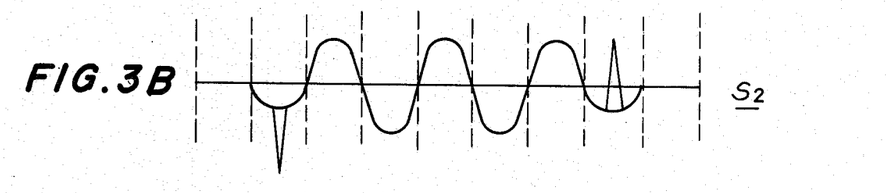
Figure 3C:
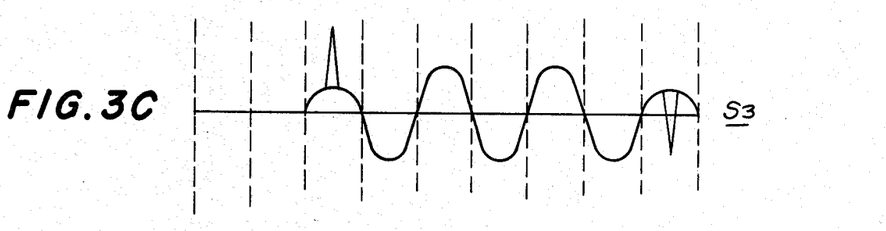
Figure 3D:
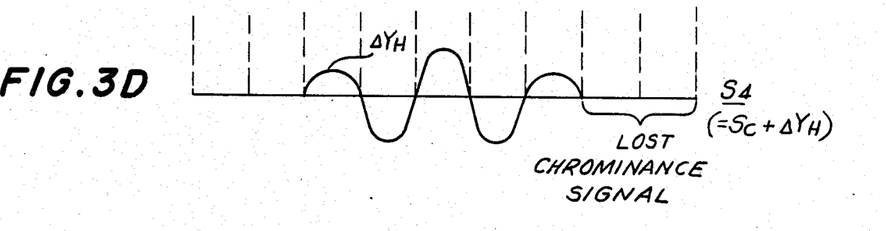

The operation of the horizontal correlation circuit 9 of FIG. 2 is further explained by the signal waveforms shown in FIGS. 3A–3D. The portion of the input signal $S_1$ applied to terminal 29 is the chrominance signal Sc, which includes the high-frequency cross-talk component $Y_H$ that would be passed by bandpass filter 8 in the circuit of FIG. 1, is represented in FIG. 3A, and FIG. 3B represents the waveform of signal $S_2$ that has been passed by delay line 31 and inverted by inverter unit 34. Note the shift of the left-most half wavelength, because the signal has been delayed by the delay line 31, and that the high-frequency cross-talk component $Y_H$ is now present as a negative-going spike due to inverter 34. Similarly, FIG. 3C represents the waveform of signal $S_3$, which has been delayed one complete subcarrier wavelength and, once again, the undesired high-frequency cross-color component $Y_H$ is still present. After the respective signals, shown in FIGS. 3A, 3B, and 3C, have been processed by the maximum and minimum circuit elements they are mixed in mixer 44, and the waveform of the resultant signal $S_4$ is shown in FIG. 3D. FIG. 3D clearly shows the principal drawback of this known prior art horizontal correlator in that a portion of the resultant signal is lost due to the requirement to employ delay lines to develop the signals that are checked against the reference level in the various maximum and minimum circuits, and this lost chrominance signal portion is identified as such in FIG. 3D. Accordingly, the present invention is intended to overcome this drawback and to substantially reduce the high-frequency cross-color component without losing any of the chrominance signal following the separation operation.

Figure 4:
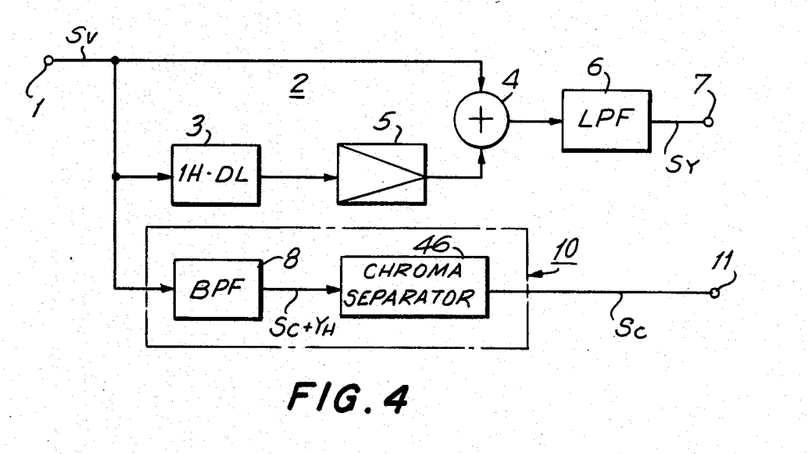
FIG. 4 is a schematic block diagram of an embodiment of the present invention.

An embodiment of the present invention is shown in FIG. 4, in which the horizontal correlator 9 of FIG. 1 is replaced by a chroma separator 46 that produces the desired chrominance output signal $S_c$ at output terminal 11. The chroma separator 46 of FIG. 4 is shown in more detail in FIG. 5. Chroma separator 46 is formed of a first unit 46A, which is substantially the same as the horizontal correlator 9 shown in detail in FIG. 2, however, the output signal thereof is fed to a second unit 46B. This second unit 46B is shown in detail in FIG. 6 and differs from the circuit of FIG. 2 in the reversal of the minimum and maximum circuits 42 and 43, respectively.

Figure 5:
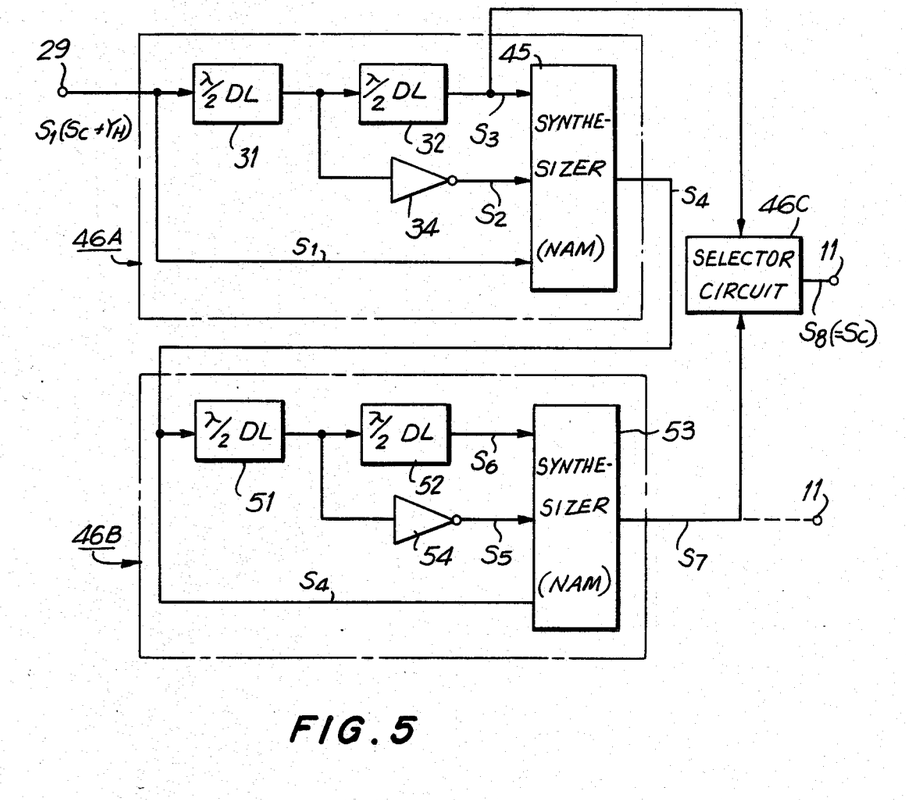
FIG. 5 is a schematic diagram of one of the two chroma separators employed in the embodiment of FIG. 4.

In the embodiment of FIG. 5, the input signal $S_1$ having the high-frequency cross-talk luminance component therein is fed to first delay line 31 and the output thereof is fed both to second delay unit 32 and to inverter 34, whereby the output of second delay unit 32 forming signal $S_3$ and the output of inverter 34 forming signal $S_2$. Both time delay lines produce a time delay equal to the period of ½ wavelength of the chrominance subcarrier signal. Signals $S_1$, $S_2$, and $S_3$ are fed to synthesizer (NAM) 45. Synthesizer 45 is essentially the same as that shown in FIG. 2 and the output signal $S_4$ thereof is fed to second unit 46B, which has a first delay line 51 receiving the signal $S_4$, with the output of first delay line 51 being fed both to a second delay line 52 and to an inverter 54. The output of second delay line 52, which forms signal $S_6$, is fed to synthesizer (NAM) 53, and the output signal $S_5$ of inverter 54 is also fed to another input of synthesizer 53, whereas signal $S_4$ is fed directly to another input of the synthesizer 46. This embodiment of the present invention has been found to provide acceptable performance without the use of delay lines 32 and 52. Thus, in a further embodiment (not shown) of this invention, the outputs of the first delay lines 31, 57 could be connected directly to synthesizers 45, 53, respectively.

Figure 6:
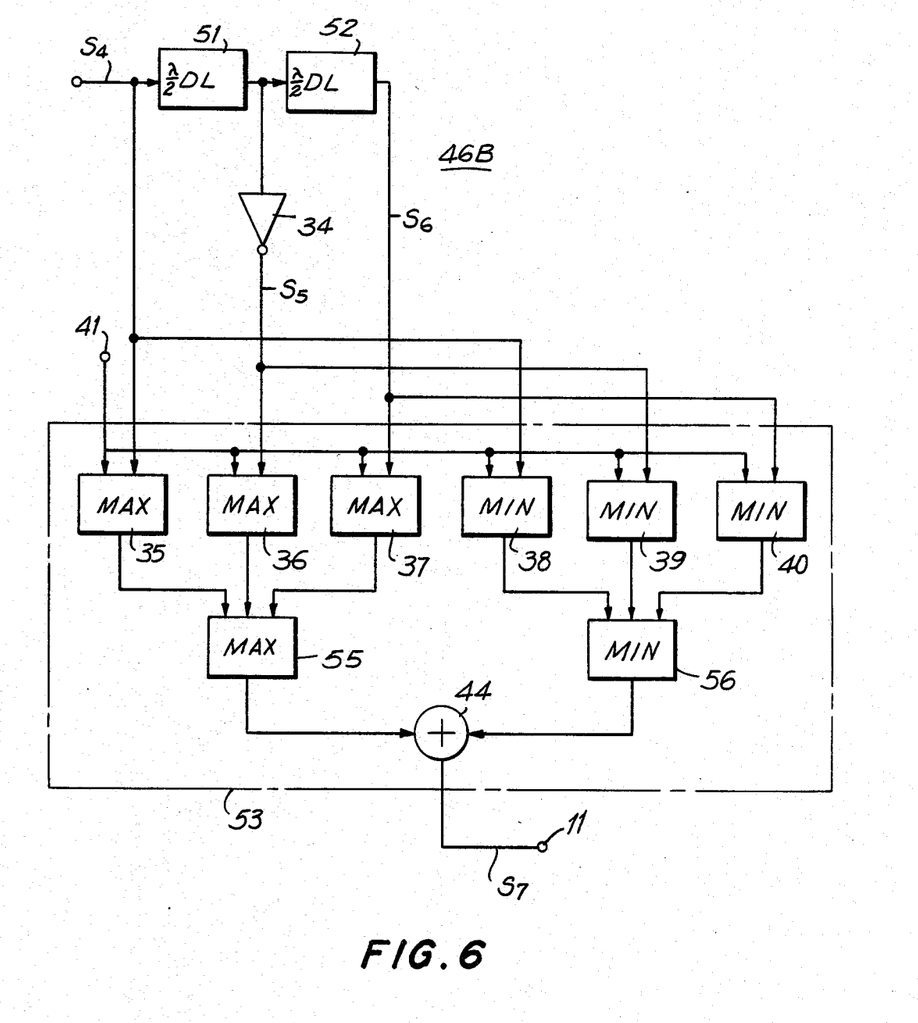
FIG. 6 is a schematic diagram of the other of the two chroma separators employed in the embodiment of FIG. 4.

Second unit 46B and synthesizer 53 are shown in detail in FIG. 6, in which it is seen that a maximum circuit 55 is provided in place of the minimum circuit 42 in the correlator of FIG. 2 and a minimum circuit 56 is provided in place of the original maximum circuit 43 in the correlator of FIG. 2. Thus, it is seen that the synthesizer (NAM) 53 will differ functionally from the synthesizer 45 utilized in the first unit 46A, and in the previously proposed horizontal correlator 9. The output signal $S_7$ from mixer 44 can be taken directly as the system output, as shown by the dashed lined leading to output terminal 11, in the embodiment of FIG. 5. In the interest of clarity in FIG. 5, the reference signal input terminals 41 have been omitted.

In order to provide an even greater probability that only the true chrominance signal will be produced, the output signal $S_7$ can be checked against a delayed version $S_3$ of the original input signal in a selector circuit 46C, which functions essentially as another synthesizer or nonadditive mixer.

Figure 7:
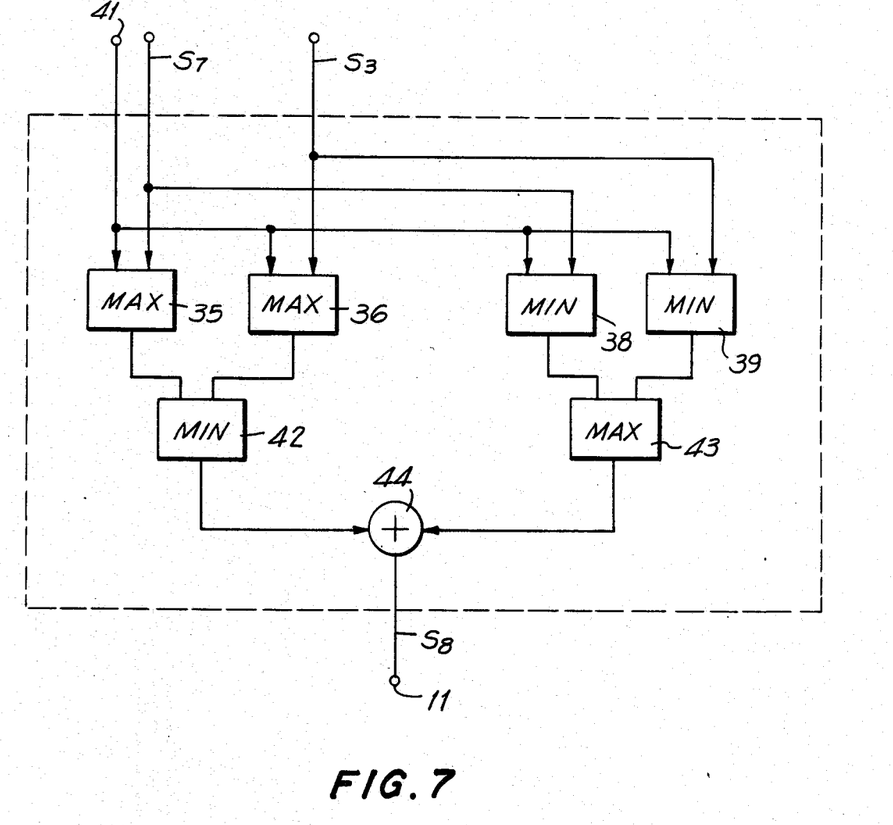
FIG. 7 is a schematic diagram of the selection circuit used in the embodiment of FIG. 5.
Figure 8A:
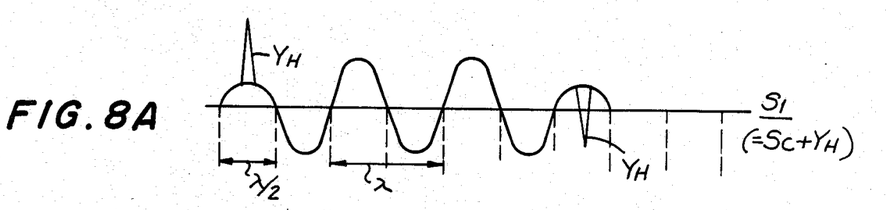
FIG. 8A-8H are signal waveforms present during operation of the circuit of FIG. 5.
Figure 8B:
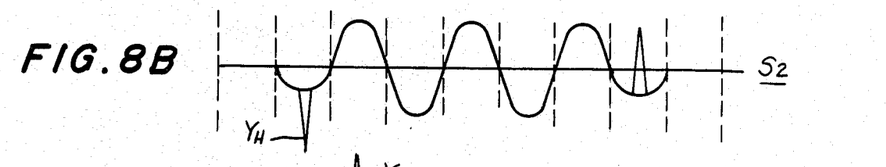
Figure 8C:
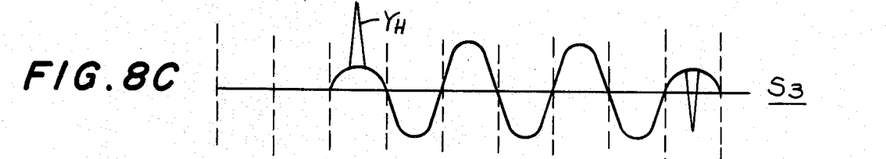
Figure 8D:
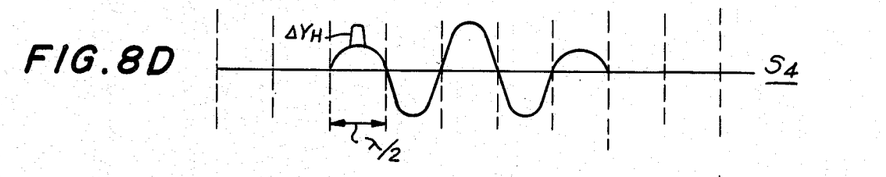
Figure 8E:
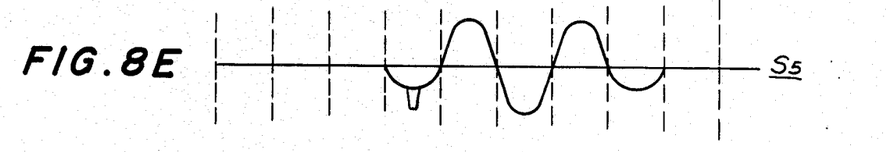
Figure 8F:
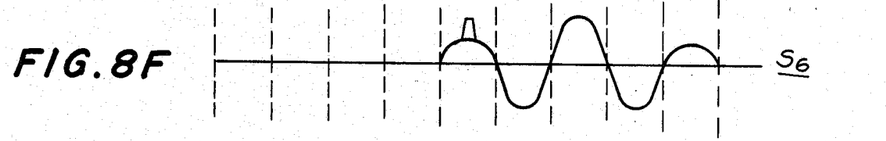
Figure 8G:
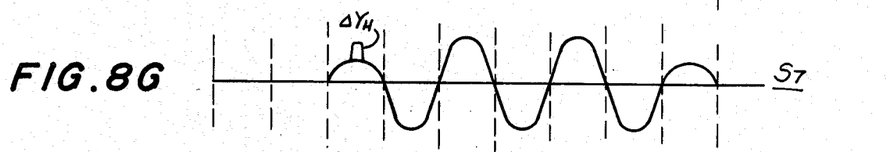
Figure 8H:
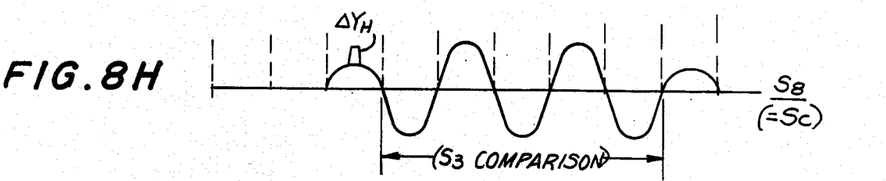

This selector circuit 46C is shown in detail in FIG. 7 and functions to select the lesser of the two signals $S_3$ and $S_7$ that are input thereto. Because selector circuit 46C selects the lesser of the two signals fed thereto it will normally select signal $S_7$, but in the event that signal $S_7$ would have noise spikes that would make it unusable, selector circuit 46C would select signal $S_3$ and the overall chrominance signal would not be excessively adversely affected. It is noted that typically signal $S_7$ will be almost the same as signal $S_3$, and the lesser level is caused by the additional signal processing in second unit 46B.

In FIG. 7 it is seen that input signal $S_7$ is fed to maximum circuit 35, and to minimum circuit 38 and input signal $S_3$ is fed to maximum circuit 36 and to minimum circuit 37, wherein both input signals are checked against the reference level, which in this case again is a zero voltage level applied at terminal 41. As in the previous embodiments this zero reference level input is not shown in FIG. 5. The outputs of maximum detecting circuits 35, 36 are fed to minimum detecting circuit 42, and the outputs of minimum detecting circuits 38, 39 are fed to maximum detecting circuit 43. Based on the above explanation of the operation of these circuits it is seen that this will result in reproducing the input signal having the lowest level. The outputs of minimum detecting circuit 42 and maximum detecting circuit 43 are nonadditively combined in mixer 44 to produce output signal $S_8$ at terminal 11.

The signal waveforms shown in FIGS. 8A through 8D correspond to the four waveforms shown in FIGS. 3A–3D, however, signal $S_4$ becomes the input signal to second chroma separator unit 46B shown in FIG. 6 and, particularly, to delay elements 51 and 52, which then delay this signal to form the multiple signals applied to synthesizer (NAM) 53. Thus, signal $S_4$ correlates to original signal $S_1$ and signal $S_5$ correlates to signal $S_2$, however, as seen in FIG. 8 note that the high-frequency cross-talk luminance component is substantially smaller than it originally was in the input signal. Finally, in FIG. 8F the input signal $S_4$ having been delayed one full wavelength period by delay lines 51 and 52 becomes signal $S_6$, again correlating substantially to original signal $S_3$ but with the cross-color component having been already substantially reduced and, further, with the original negative going cross-color component having been displaced in time so that it does not form part of the final output signal. Thus, signal $S_7$ is the waveform in FIG. 8G, and this signal is made up of all of the highest positive-going portions present in signals $S_4$, $S_5$, and $S_6$ and of all of the lowest negative-going portions in those same signals. Accordingly, the signal loss that was previously inherent in the output signal $S_4$ due to the arrangement of the previously proposed horizontal correlator is now made up at the last wave length of the output signal by using the second chroma separator 46B including synthesizer (NAM) 53, and the cross-color component is substantially minimized as well. Moreover, this signal $S_7$ can also be fed to selector circuit 46C, which operates to select the lower level signal of the two input signals fed thereto, that is, signal $S_7$ from the chroma separator 46B and signal $S_3$ which is the output of second delay line 32 in chroma separator 46B. Selector circuit 46C then produces signal $S_8$ shown in FIG. 8H, which is substantially a pure chrominance signal having the same length as the original input signal $S_1$. The comparison of the two signals in selector circuit 46C should take place over a controlled period and this is so labelled in FIG. 8H.

Figure 9:
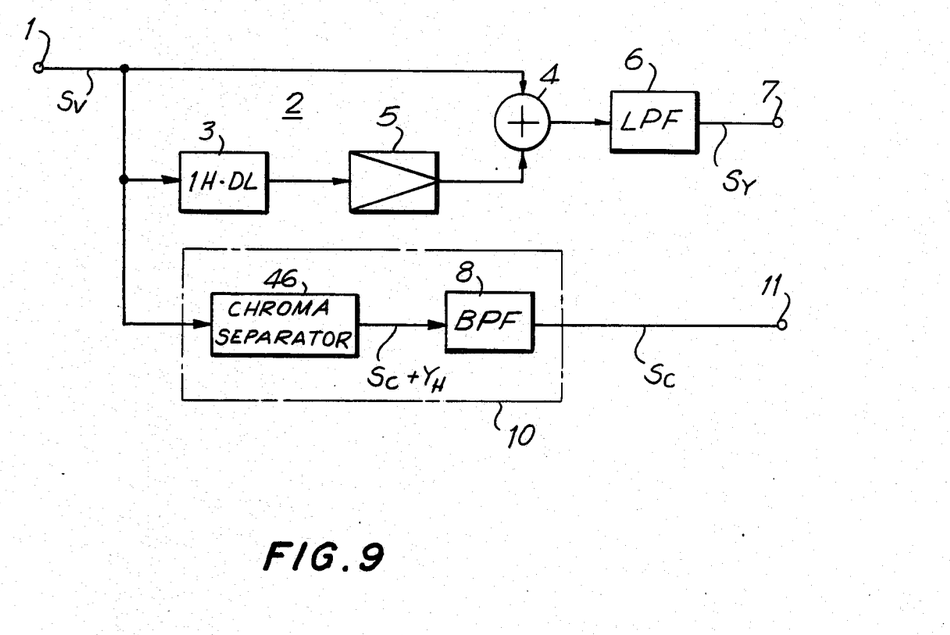
FIG. 9 is a schematic block diagram of another embodiment of the present invention.

A further embodiment of the invention is shown in FIG. 9 in which the bandpass filter 7 and the chroma separator 46 are reversed in serial position, and in this embodiment the output $S_c$, whether taken from signal $S_7$ or signal $S_8$, still provides a substantially pure chrominance signal having the desired length. Because the high-frequency cross-color component is removed by the chroma separator, the bandpass filter 7 can adequately remove the rest of the luminance signal from the composite video and pass only the chrominance signal.

Although illustrative embodiments of the present invention have been described in detail above with reference to the accompanying drawings, it is understood that the invention is not limited to those precise embodiments, and that various changes and modifications can be effected therein by one skilled in the art without departing from the scope or spirit of the invention, as defined by the appended claims.

What is claimed is:

1. Apparatus for removing high-frequency luminance cross-talk components from a chrominance signal modulated on a chrominance subcarrier signal and formed as part of a composite video signal of specified length, comprising:

first chroma separator means receiving said composite video signal and including first delay means for imparting a first time delay based on a period of said chrominance subcarrier signal to said composite video signal and producing a first time delayed output and first signal synthesizer means receiving said composite video signal and said first time delayed output for producing therefrom a first horizontally correlated, synthesized output signal formed of said chrominance signal and reduced cross-talk components; and second chroma separator means receiving said first horizontally correlated, synthesized output signal from said first chroma separator means and including second delay means for imparting to said synthesized output signal a time delay corresponding to said first time delay and producing a second time delayed output therefrom and a second signal synthesizer means receiving said second time delayed output and said first horizontally correlated, synthesized output signal from said first chroma separator means for producing therefrom a second horizontally correlated, synthesized output signal having a length substantially equal to said specified length of said composite video signal.

2. Apparatus according to claim 1, in which said first delay means includes a first delay line having a time delay equal to the period of ½ the wavelength of said chrominance subcarrier signal.

3. Apparatus according to claim 2, further comprising a signal inverter for inverting said first time delayed signal and said inverted first time delayed signal being fed to said first synthesizer means.

4. Apparatus according to claim 3, in which said first delay means further includes a second delay line having a time delay equal to the period of ½ the wavelength of said chrominance subcarrier signal and receiving said first time delayed signal from said first delay line and the output of said second delay line being fed to said first synthesizer means.

5. Apparatus according to claim 1, in which said second delay means includes a first delay line having a time delay equal to the period of ½ wavelength of said chrominance subcarrier signal.

6. Apparatus according to claim 5, further comprising a signal inverter for inverting said second time delayed signal and said inverted second time delayed signal being fed to said second synthesizer means.

7. Apparatus according to claim 6, in which said second time delay means further comprises a second delay line having a time delay equal to the period of ½ the wavelength of said chrominance subcarrier signal and receiving said second time delayed signal from said first delay line of said second delay means and producing an output therefrom fed to said second synthesizer means.

8. Apparatus according to claim 1, further comprising selector circuit means receiving said first time delayed output and said second horizontally correlated, synthesized output signal from said second synthesizer means for selecting therebetween the signal having the lowest relative level.

9. Apparatus according to claim 8, in which said selector circuit means includes:
first maximum detecting circuit receiving said first time delayed output and a reference level signal for reproducing the signal having the greater level as an output signal;
second maximum detecting circuit receiving said output signal from said second signal synthesizer means and said reference level signal for reproducing the signal having the greater level as an output signal;
first minimum detector circuit receiving said output signals from first and second maximum detecting circuits for reproducing the signal having the lesser level as an output signal;
second minimum detecting circuit receiving said first time delayed output and said reference level signal for reproducing the signal having the lesser level as an output signal;
third minimum detecting circuit receiving said output signal from said second signal synthesizer means and said reference level signal for reproducing the signal having the lesser level as an output signal;
third maximum detecting circuit receiving said output signals from said second and third minimum detecting circuits for reproducing the signal having the greater level as an output signal; and
mixer means receiving said output signals from said first minimum detecting circuit and said third maximum detecting circuit for producing a nonadditive mixed output signal therefrom.

10. Apparatus according to claim 1, in which said second signal synthesizer means includes maximum detecting means receiving said output from said first signal synthesizer means, said second time delayed output and a reference level signal for reproducing the signal having the highest positive level as an output signal;
minimum detecting means receiving said output signal from said first signal synthesizer means, said second time delayed output, and said reference level signal for reproducing the signal having the lowest negative level as an output signal;
and mixer means receiving said output signals from said maximum detecting means and said minimum detecting means for producing a nonadded mixed output signal therefrom.

11. Apparatus according to claim 10, in which said maximum detecting means includes a plurality of maximum level detecting circuits each receiving at one input said reference level signal and at another input one of said first time delayed output or said composite video signal and each reproducing as an output signal the signal having the greater level, and a further maximum level detecting circuit receiving said output signals from said plurality of maximum level detecting circuits for reproducing as an output signal the signal having the highest level.

12. Apparatus according to claim 10, in which said minimum detecting means includes a plurality of minimum level detecting circuits each receiving at one input said reference level signal and at another input one of said first time delayed output or said composite video signal and each reproducing as an output signal the signal having the lowest level, and a further minimum level detecting circuit receiving said output signals from said plurality of minimum level detecting circuits for reproducing as an output signal the signal having the greatest level.

13. Apparatus according to claim 1, in which said composite video signal is formed of a luminance signal component and said chrominance signal and further comprising a bandpass filter receiving said composite video signal for filtering therefrom substantially all of said luminance signal and producing a filtered output signal fed as said composite video signal to said first chroma separator means.

14. Apparatus according to claim 1, in which said composite video signal is formed of a luminance signal component and said chrominance signal and further comprising a bandpass filter means receiving said second horizontally correlated, synthesized output signal from said second synthesizer means for filtering therefrom substantially all of said luminance signal.

15. Apparatus according to claim 1, in which said composite video signal is formed of a luminance signal component and said chrominance signal and further comprising a selector circuit connected to receive said first time delayed output and said second horizontally correlated, synthesized output signal from said second synthesizer means for producing an output signal corresponding to the input signal having a lower level, and bandpass filter means receiving said output signal from said selector circuit for filtering therefrom substantially all of said luminance signal.

16. A circuit for removing high-frequency cross-talk from a chrominance signal modulated on a chrominance subcarrier signal and formed as a portion of a composite video signal having predetermined time length, comprising:

a first chroma separator receiving said composite signal and including first delay means for providing a first time delay based on a period of said chrominance subcarrier signal and producing a corresponding first delayed output, and a first signal synthesizer receiving said portion of said composite video signal and said first delayed output for producing therefrom a horizontally correlated, synthesized output signal formed of said chrominance signal with reduced cross-talk and having length less then said predetermined time length; and second chroma separator means receiving said horizontally correlated, synthesized output signal from said first chroma separator means and including second delay means for providing a time delay corresponding to said first time delay and producing a second delayed output, and a second signal synthesizer receiving said second delayed output and said horizontally correlated, synthesized output signal from said first chroma separator means for producing therefrom a second horizontally correlated, synthesized output signal having a length substantially equal to said predetermined time length of said composite video signal.

17. A circuit according to claim 16, further comprising selector circuit means receiving said first delayed output and said second horizontally correlated, synthesized signal from said second signal synthesizer for reproducing the signal having the lowest relative level as an output signal.

18. A circuit according to claim 17, in which said selector circuit means includes:

first maximum detecting circuit receiving said first delay output and a reference level signal for reproducing the signal having the greater level as an output signal;

second maximum detecting circuit receiving said output signal from said second signal synthesizer and said reference level signal for reproducing the signal having the greater level as an output signal;

first minimum detector circuit receiving said output signals from first and second maximum detecting circuits for the signal having the lesser level as an output signal;

second minimum detecting circuit receiving said first delayed output signal and said reference level signal for reproducing the signal having the lesser level as an output signal;

third minimum detecting circuit receiving said output signal from said second signal synthesizer and said reference level signal for reproducing the signal with the lesser level as an output signal;

third maximum detecting circuit receiving said output from said second and third minimum detecting circuits for reproducing the signal having the greater level as an output signal; and mixer means receiving said output signals from first minimum detecting circuit and said third maximum detecting circuit for producing a nonadditive mixed output signal therefrom.

19. Apparatus according to claim 16, in which said second synthesizer means includes maximum detecting means receiving said output signal from said first signal synthesizer means, said second delayed output, said and a reference level signal for reproducing the signal to the highest level as an output signal;

minimum detecting means receiving said first delayed output, said composite video signal, and said reference level signal for reproducing signal having the lowest level as an output signal;

and mixer means receiving said output signal from said maximum detecting means and said minimum detecting means for producing a nonadditive mixed output signal therefrom.

20. Apparatus according to claim 19, in which said maximum detecting means includes a plurality of maximum level detecting circuits each receiving at one input said reference level signal and at another input one of said second delayed output or said output signal from said first signal synthesizer and each reproducing as an output signal means, the signal having the greater level, and a further maximum level detecting circuit receiving said output signals from said plurality of maximum level detecting circuits for reproducing as an output signal the signal having the highest level.

21. Apparatus according to claim 19, in which said minimum detecting means includes a plurality of minimum level detecting circuits each receiving at one input said reference level signal and at another input one of said second delayed output or said output signal from said first signal synthesizer means, and each reproducing as an output signal the signal having the lowest level, and a further minimum level detecting circuit receiving said output signals from said plurality of minimum level detecting circuits for reproducing as an output signal the signal having the lowest level.

22. Apparatus according to claim 16, in which said composite video signal is formed of a luminance signal component and said chrominance signal and further comprising a bandpass filter receiving said composite video signal for filtering therefrom substantially all of said luminance signal and producing a filtered output signal fed as said composite video signal to said first chroma separator means.

23. Apparatus according to claim 16, in which said composite video signal is formed of a luminance signal component and said chrominance signal and further comprising a bandpass filter means receiving said second horizontally correlated, synthesized output signal from said second synthesizer means for filtering therefrom substantially all of said luminance signal.

24. Apparatus according to claim 16, in which said composite video signal is formed of a luminance signal component and said chrominance signal and further comprising a selector circuit connected to receive said first time delayed output and said second horizontally correlated, synthesized output signal from said second synthesizer means for producing an output signal corresponding to the input signal having a lower level, and bandpass filter means receiving said output signal from said selector circuit for filtering therefrom substantially all of said luminance signal.

* * * * *